Oct. 30, 1945.　　　　I. G. MALOFF　　　　2,387,852
PRECISION MEASURING APPARATUS
Filed Oct. 25, 1943
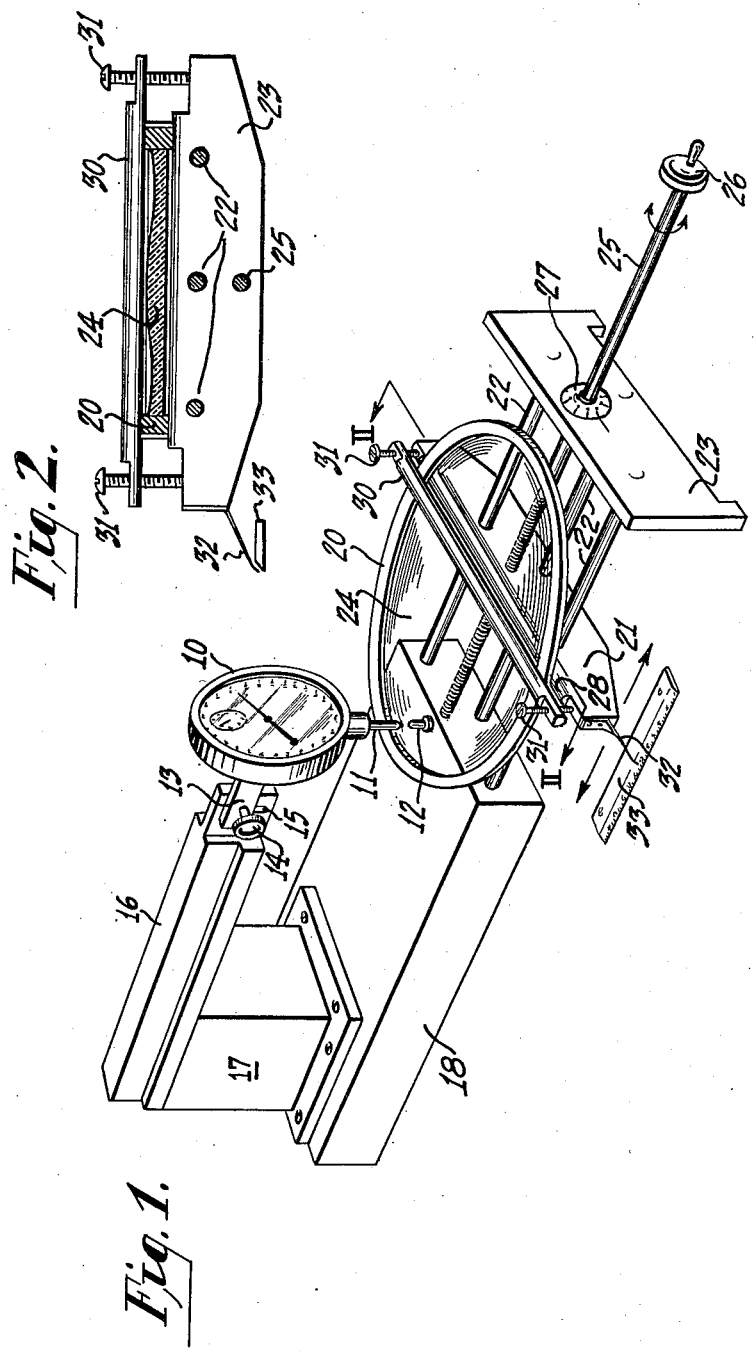
Inventor
IOURY G. MALOFF
By
*CD Tuska*
Attorney Patented Oct. 30, 1945

2,387,852

UNITED STATES PATENT OFFICE 2,387,852

PRECISION MEASURING APPARATUS

Ioury G. Maloff, Camden, N. J., assignor to Radio Corporation of America, a corporation of Delaware Application October 25, 1943, Serial No. 507,538

7 Claims. (Cl. 33—174)

The present invention relates to measuring apparatus and more particularly to a precision instrument for determining the difference between slopes of the surfaces on the opposite sides of a lens of the so-called Schmidt-Kellner type, which is to be used for extremely high light gathering power.

In recent years a great deal of work has been done in applying the well known principle of Schmidt-Kellner camera-telescope to perform other useful tasks. Among such tasks are camera for aerial photography, projection of television images, pick up of scenes in television transmitter, etc. Wherever the extremely high light gathering power is required, there is an application of the said type of instrument. While in case of conventional lenses with spherical surfaces, a spherometer is a very good, accurate means of determining the radius of curvature of the lens, in case of the aspherical Schmidt-Kellner type lens it is inadequate, and the micrometer is likewise.

By way of example, the lens in an instrument of the Schmidt-Kellner type is usually in the form of a thin circular element of the order of .250 inch in thickness, one side of which is flat while the other is a surface of revolution of a very shallow letter S. The greatest depth of the surface may be of the order of .050 inch, while the diameter of the lens is about 8 inches in one particular popular model.

The accuracy with which the lens meets the design may be judged by the depth of deviation from the plane, measured along a radius of the lens. However, since the refracting effect of a thin lens depends on the difference between slopes of the surfaces on the two opposite sides of the lens, the refracting effect may be judged by measuring thicknesses of the lens along a radius of it and evaluating mean slopes from a series of such measurements.

In the process of grinding such lenses, the usual practice has been, first, to rough out the surface approximately to a template ground to a curve the surface of revolution of which is intended to form the lens. Then the lens is ground with fine abrasive and is checked during fine grinding by means of either a spherometer or a long jaw micrometer. This operation, while probably more accurate than the template, is still not good enough to be able to say whether or not the lens is true enough for optical purposes, the chief source of errors being the inability to know exactly the particular distance along the radius at which the measurement is being made.

Because of inadequacy of mechanical measuring methods, it has been customary to resort to optical methods of testing which greatly prolonged the process. In order that optical testing may be performed, the lens surface must be first brought up to a reasonable polish, then tested, and then, if found to be not true, it has to be ground again, polished and tested again.

An accurate and reliable mechanical measuring instrument was required to eliminate this repeated polishing and optical testing and greatly reduce the time required to make an aspherical lens, and in this way greatly reduce the cost.

In recent years, applicant has endeavored to produce lenses for Schmidt-Kellner optics from transparent plastic, namely, methyl methacrylate, by compression molding process. Molding process required preparation of molding surfaces from metal with its surfaces in the shape of negative replica of the desired lens. In this case optical testing was even more difficult, since the surface being worked on had to be put into molding chave and a test lens had to be molded before optical testing of aspherical surface could be undertaken.

By actual experience, applicant has determined that the lens or its negative replica, to be satisfactory for most of the optical purposes, that is, to have slopes sufficiently accurate, it must show thickness true to ±.0001 inch with certainty of the radius at which the measurement is made of at least ±.001 inch. The required accuracy just given applies to the case of exemplary lens described above. In other words, an accurate thickness of the plate at a point certain to .001 inch out of a 4-inch radius, the thickness being certain to .0001 in .2500 inch. The two accuracies required are then one part in 4,000 and one part in 2,500, respectively.

Some of the objects of the present invention are: to provide an instrumentality for reliably testing dimensions of thin, large lenses, such as correcting lenses of the Schmidt-Kellner type; to provide a measuring instrument capable of determining lens slopes so accurately as to show thickness true to ±.0001 inch with certainty of the radius at which the measurement is made of, at least ±.001 inch; to provide an apparatus for the precision measuring of lens thickness throughout a plurality of points along a radius of a lens; to provide a measuring instrument wherein a lens and a micrometer have relative movement so that a succession of tests can be made and indicated along a radius of the lens; to provide a measuring instrument wherein errors normally affecting an accurate reading can be so reduced as to become negligible; and to provide other improvements as will hereinafter appear.

In the accompanying drawing, Fig. 1 represents a perspective of a measuring apparatus embodying one form of the present invention; and Fig. 2 represents a sectional detail on line 2—2 of Fig. 1.

Referring to the drawing, one form of the invention comprises a micrometer gage 10 of precision, fully jewelled spring type, provided with a dial graduated in .0001 of an inch or other suitable indicating system and having its pointer under the control of a plunger 11 outwardly pressed by a spring or other well-known means to normally seat on an anvil 12 but inwardly movable to receive the object (such as a lens) the thickness of which is to be measured. The micrometer dial is preferably set at zero when the plunger is in contact with the anvil 12. Thus, the instrument includes two opposed contacts, one of which is movable and the other fixed, while the distance between them determines the thickness of an object inserted between them, such distance being accurately indicated on the gage 10.

For mounting the gage 10, it is attached to a rearwardly projecting clamping bracket 13 having a locking screw 14 which traverses a slot 15 in a fixed arm 16 so that the gage can be adjusted with respect to the anvil 12. The arm 16 projects horizontally from a pedestal 17, and generally parallels the face of the base 18 upon which the pedestal 17 is supported in fixed position. The anvil 12 is fixed in vertical position, preferably, near the end of the base opposite to that end carrying the pedestal 17, and when the gage is located with its plunger 11 in co-axial alinement with the anvil 12, the instrument is ready for use.

In order to cause an object, such as a lens 20, to be located between or to travel between the opposed gage contacts, a carriage, here shown as in the form of an elongated bar 21, is provided having a plurality of guide apertures (three have been found satisfactory) for respectively receiving guide rods 22 which are fixed at one end to the base 18 and at the other end to a fixed plate 23. The arrangement of the guide apertures and rods 22 is such that they form the apices of an isosceles triangle and hence operate to maintain the bar 21 in an accurate operating position at all times.

For causing the carriage 21 to travel along the supporting guide rods 22, it is threaded on a micrometer feed screw 24 having bearings respectively in the base 18 and plate 23, from which latter it projects as an unthreaded extension 25 to mount an operating hand wheel 26. The rotation of the feed screw 24, as to number of turns or any angle of rotation, can be observed on a graduated dial 27, abutting the plate 23 and through which the extension 25 passes.

As a means for clamping the lens 20 in place upon the carriage, the upper face 28 of the bar 21 is formed as an arc, the opposite edges of which merge into the respective sides of the bar 21. Thus, any plane surface resting on the face 28 will have a line contact therewith. Parallel to and superposed with respect to the face 28 is a clamping member 30, in the form of a relatively small diameter cylindrical rod, which is mounted on adjusting screws 31 traversing the respective ends thereof and entering the bar 21. Thus, with the lens 20 gripped between the bar 21 and the member 30, in a line contact at a distance from the edge of the lens less than the radius of the lens, that portion of the lens between its center and the opposite lens edge can then be fed between the gage contacts.

For measuring the travel of the carriage bar 21, a pointer 32 is fixed to one end thereof to project above and into close readable proximity to a graduated scale 33.

In the use of the instrument, the plunger 11 is adjusted for exact vertical alinement with the anvil contact 12, so that any error due to vertical misalinement is so reduced as to be negligible in the gage reading. Since the lens 20 is supported by the arcuate edge 28 it can automatically tilt for engagement with the contact 12 to thereby compensate for any deviation of the plane lower surface of the lens. As the point of contact of the two opposed contacts is on the opposite side of the lens center from the lens supporting bar 21, all readings of the indicating gage are in terms of the cosine of the angle of misalinement and all errors are proportional to unity minus cosine of the angle of misalinement. Thus, all elements liable to cause errors become ineffective because the angle of misalinement is easily maintained under one degree while the instrument is required to read but one part in twenty-five hundred. For such an error to develop the combined misalinement would have to be two and one-half degrees which greatly exceeds any normal operating condition.

Having thus described my invention, I claim:

1. A measuring apparatus comprising a device for clamping a lens at one side of its center to provide a line contact as an axis permitting tilting of the lens, a fixed support for said lens at the opposite side of said center, a vertically movable plunger for contacting the face of said lens opposite to said support, a thickness indicating gage operated by said plunger, and means for moving said device to vary the radial relation of said plunger on said lens.

2. A measuring apparatus comprising a device for clamping a lens at one side of its center to provide a line contact as an axis permitting tilting of the lens, a fixed support for said lens at the opposite side of said center, a vertically movable plunger for contacting the face of said lens opposite to said support, a thickness indicating gage operated by said plunger, means for moving said device to vary the radial relation of said plunger on said lens, and means for indicating the distance said device is moved.

3. A measuring apparatus comprising a clamping device formed by two elongated members having transversely arcuate juxtaposed surfaces for gripping a lens therebetween for tilting action and means for regulating the gripping action, an anvil for supporting one portion of the lens at a point removed from said device, a vertical movable plunger for contacting the face of the lens opposite to said anvil, a thickness indicating gage operated by said plunger, and means for moving said device to vary the radial relation of said plunger on said lens.

4. A measuring apparatus comprising means including a gage and alined contacts to receive a lens therebetween for measuring the thickness of said lens, means supporting said lens for free tilting action, and means for moving said supporting means to vary the measuring position of said contacts relative to said lens while maintaining said contacts alined.

5. An instrument for determining differences of radial slopes between two opposite sides of shallow thin optical elements, such as correcting lenses of Schmidt-Kellner type by measuring actual thickness of the lens along a radius at preferably frequent intervals, comprising the combination of a spring type precision gage, having a movable plunger, capable of accurately measuring thickness of at least .400 inch to an accuracy of .0001 in association with a fixed anvil alined with said plunger on the opposite side of said lens, and a carriage movable at right angles to the direction of travel of said plunger, means including a micrometer screw for moving said carriage transversely between and relative to said plunger and anvil, means for indicating the position of said carriage with respect to said anvil to within .001 of an inch, and means for supporting a lens so that the weight of the lens maintains said lens in constant contact with said anvil.

6. An instrument for determining differences of radial shapes between two opposite sides of shallow, thin, optical elements comprising a clamping device formed by two elongated members for gripping a lens therebetween in a state of unbalance for self-adjustment with said members as an axis, an anvil support beneath the heavier portion of said unbalanced lens, a movable plunger for contacting the face of the lens opposite to and alined with said anvil, and a thickness gage operated by said plunger.

7. An instrument for determining differences of radial shapes between two opposite sides of shallow, thin, optical elements comprising a clamping device formed by two elongated members for gripping a lens therebetween in a state of unbalance for self-adjustment with said members as an axis, an anvil support beneath the heavier portion of said unbalanced lens, a movable plunger for contacting the face of the lens opposite to and alined with said anvil, a thickness gage operated by said plunger, and means for moving said clamping device with the attached lens in a radial direction to vary the contact points of said plunger and anvil, whereby the thickness of the lens can be measured at selected intervals.

IOURY G. MALOFF.